United States Patent
Südow et al.

(10) Patent No.: US 9,932,093 B2
(45) Date of Patent: Apr. 3, 2018

(54) TOWING METHODS AND SYSTEMS FOR GEOPHYSICAL SURVEYS

(71) Applicant: PGS Geophysical AS, Oslo (NO)

(72) Inventors: Mattias Südow, Solna (SE); Martin Austad, Oslo (NO); Kenneth Karlsen, Aalesund (NO); Bergur Vinther, Sumba (FO); Jan-Allen Muller, Horsens (DK); Claus Clausen Petersen, Horsens (DK)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/879,588

(22) Filed: Oct. 9, 2015

(65) Prior Publication Data
US 2016/0031529 A1 Feb. 4, 2016

Related U.S. Application Data

(63) Continuation of application No. 13/539,845, filed on Jul. 2, 2012, now Pat. No. 9,188,691, which is a
(Continued)

(51) Int. Cl.
*B63B 21/66* (2006.01)
*G01V 1/38* (2006.01)
(Continued)

(52) U.S. Cl.
CPC ............... *B63B 21/66* (2013.01); *B63G 8/00* (2013.01); *G01V 1/3826* (2013.01); *G01V 3/17* (2013.01)

(58) Field of Classification Search
CPC ...... G01V 1/3826; G01V 1/201; G01V 3/083; G01V 3/12; G01V 3/17; G01V 1/13;
(Continued)

(56) References Cited

U.S. PATENT DOCUMENTS

| 3,604,661 A | 9/1971 | Mayer, Jr. |
| 3,774,570 A | 11/1973 | Pearson |

(Continued)

FOREIGN PATENT DOCUMENTS

| EP | 2128654 | 12/2009 |
| EP | 2249184 | 11/2010 |

(Continued)

OTHER PUBLICATIONS

Diab Group, Divinycell HCP, Apr. 2011.
(Continued)

*Primary Examiner* — Luke Ratcliffe
*Assistant Examiner* — Amie M N'Dure

(57) ABSTRACT

Disclosed are methods and systems for controlling spread and/or depth in a geophysical survey. An embodiment discloses a submersible deflector, comprising: an upper portion comprising an upper fin section and upper foils disposed below the upper fin section, wherein at least one slot is defined between the upper foils; and a lower portion coupled to the upper portion and disposed below the upper portion, wherein the lower portion comprises a lower fin section and lower foils disposed above the lower fin section, wherein at least one slot is defined between the lower foils. Also disclosed are marine geophysical survey systems and methods of performing geophysical surveys.

24 Claims, 10 Drawing Sheets

Related U.S. Application Data continuation of application No. 13/176,665, filed on Jul. 5, 2011, now Pat. No. 8,976,623.

(51) Int. Cl.
*G01V 3/17* (2006.01)
*B63G 8/00* (2006.01)

(58) Field of Classification Search
CPC .... G01V 1/3808; B63B 21/66; B63B 21/663;
B63B 9/08; G01B 3/22; G01C 21/18;
A01K 73/05; G06F 9/505; H01B 7/12;
B63G 8/00
USPC ............ 367/14–20, 33–38, 56–58, 154, 116;
181/5, 112, 122; 343/709; 114/242, 246,
114/253; 33/559; 73/490; 324/365;
709/226; 366/18; 5/122
See application file for complete search history.

(56) References Cited

U.S. PATENT DOCUMENTS

| | | | |
|---|---|---|---|
| 3,779,199 A | 12/1973 | Mayer, Jr. | |
| 3,984,706 A | 10/1976 | Inouye | |
| 4,271,925 A | 6/1981 | Burg | |
| 5,424,591 A | 6/1995 | Kuriyama | |
| 5,913,280 A | 6/1999 | Nielsen et al. | |
| 5,959,938 A * | 9/1999 | Behrens | G01V 1/38 |
| | | | 181/120 |
| 6,144,342 A | 11/2000 | Bertheas et al. | |
| 6,273,015 B1 | 8/2001 | Motsenbocker et al. | |
| 6,571,722 B2 | 6/2003 | Motsenbocker et al. | |
| 6,714,867 B2 | 3/2004 | Meunier | |
| 7,131,389 B1 | 11/2006 | Hawkes | |
| 7,142,481 B1 | 11/2006 | Metzbower et al. | |
| 7,184,365 B2 | 2/2007 | George et al. | |
| 7,298,672 B1 | 11/2007 | Tenghamn et al. | |
| 7,404,370 B2 | 7/2008 | Stokkeland | |
| 7,450,467 B2 * | 11/2008 | Tveide | B63B 21/56 |
| | | | 114/245 |
| 7,658,161 B2 | 2/2010 | Toennessen et al. | |
| 7,800,976 B2 | 9/2010 | Stokkeland et al. | |
| 7,834,632 B2 | 11/2010 | Tenhgamn et al. | |
| 7,835,224 B2 * | 11/2010 | Robertsson | B63B 21/56 |
| | | | 367/20 |
| 7,881,153 B2 | 2/2011 | Stokkeland et al. | |
| 7,881,158 B2 | 2/2011 | Tegnhamn | |
| 7,974,152 B2 | 7/2011 | Tegnhamn | |
| 8,400,871 B2 * | 3/2013 | Meldahl | 367/16 |
| 8,573,050 B2 | 11/2013 | Sudow et al. | |
| 8,976,623 B2 | 3/2015 | Sudow et al. | |
| 2002/0088387 A1 | 7/2002 | Motsenbocker et al. | |
| 2008/0022913 A1 * | 1/2008 | Toennessen | A01K 73/05 |
| | | | 114/245 |
| 2008/0128134 A1 | 6/2008 | Mudunuri et al. | |
| 2008/0192570 A1 | 8/2008 | Lennart Tenghamn et al. | |
| 2008/0232195 A1 * | 9/2008 | Bloor | G01V 1/30 |
| | | | 367/38 |
| 2009/0050044 A1 * | 2/2009 | Stokkeland | G01V 1/3826 |
| | | | 114/244 |
| 2009/0241826 A1 | 10/2009 | Vosburgh et al. | |
| 2010/0118646 A1 | 5/2010 | Tenghamn | |
| 2010/0118647 A1 | 5/2010 | Tenghamn | |
| 2010/0126057 A1 * | 5/2010 | Safwat | A01K 73/045 |
| | | | 43/9.7 |
| 2010/0128561 A1 * | 5/2010 | Meldahl | G01V 1/3826 |
| | | | 367/16 |
| 2010/0149910 A1 | 6/2010 | Martin | |
| 2010/0302900 A1 | 12/2010 | Tenghamn | |
| 2011/0038225 A1 | 2/2011 | Tenghamn | |
| 2011/0103179 A1 * | 5/2011 | Vageskar | G01V 1/3808 |
| | | | 367/17 |
| 2011/0139055 A1 | 6/2011 | Stokkeland et al. | |
| 2012/0180712 A1 | 7/2012 | Vosburgh et al. | |
| 2013/0010570 A1 * | 1/2013 | Sudow | G01V 1/3826 |
| | | | 367/16 |
| 2013/0010571 A1 * | 1/2013 | Sudow | G01V 1/3826 |
| | | | 367/16 |
| 2013/0272090 A1 * | 10/2013 | Peppe | G01V 1/20 |
| | | | 367/17 |
| 2014/0204705 A1 | 7/2014 | Tonchia | |
| 2014/0321238 A1 | 10/2014 | Winfield | |
| 2015/0020726 A1 | 1/2015 | Mclemore et al. | |

FOREIGN PATENT DOCUMENTS

| | | |
|---|---|---|
| EP | 2317341 | 4/2011 |
| GB | 2342081 | 4/2000 |
| GB | 2399883 | 9/2004 |
| WO | 9912055 | 3/1999 |
| WO | 0159481 | 8/2001 |
| WO | 2010023068 | 3/2010 |
| WO | 2013014507 | 1/2013 |

OTHER PUBLICATIONS

Trelleborg Emerson & Cumming, Inc., Syntac 351 A Pre-Blended Castable Syntactic Composite Material for Termoforming, Technical Datasheet, Mansfield, Massachusetts.
French Preliminary Search Report for French Application No. 1256490 dated Feb. 16, 2015.
UK Search Report for Application No. GB1211879.0 dated Oct. 16, 2012.
Johan Mattsson, et al., "Error Analysis and Capability Modelling for Towed Streamer Electomagnetics," First Break, Aug. 2012, pp. 91-96, vol. 30.
Johan Mattsson, et al., "Towed Streamer EM: The challenges of Sensitivity and Anisotrophy," First Break, Jun. 2013, pp. 155-159, vol. 31.
Chris Anderson, et al., "An Integrated Aproach to Marine Electromagnetic Surveying Using a Towed Streamer and Source," First Break, May 2010, pp. 71-75, vol. 28.
Patent Examination Report No. 1, dated Oct. 28, 2013, IP Australia, Australian Government, Australia.
French Preliminary Search Report for Application No. 1256491 dated Jul. 28, 2017.
UK Examination Report for Application No. GB 1211879.0 dated Mar. 6, 2014.
Australian examination report for counterpart Application No. 2012203912 dated Oct. 9, 2014.

* cited by examiner

TOWING METHODS AND SYSTEMS FOR GEOPHYSICAL SURVEYS

CROSS-REFERENCE TO RELATED APPLICATIONS

The present application is a continuation of U.S. patent application Ser. No. 13/539,845, filed on Jul. 2, 2012, which is a continuation of U.S. patent application Ser. No. 13/176,665, filed on Jul. 5, 2011, issued as U.S. Pat. No. 8,976,623, the entire disclosures of which are incorporated herein by reference.

BACKGROUND

The present invention relates generally to the field of marine geophysical surveying. More particularly, in one or more embodiments, this invention relates to towing methods and systems for controlling spread and/or depth in a geophysical survey.

Certain types of marine geophysical surveying, such as seismic or electromagnetic surveying, include towing an energy source at a selected depth in a body of water. One or more geophysical sensor streamers also may be towed in the water at selected depths. The streamers are essentially long cables having geophysical sensors disposed thereon at spaced apart locations. Actuation of the energy source emits an energy field into the body of water. The energy field interacts with the rock formations below the water bottom. Energy that interacts with interfaces, generally at the boundaries between layers of rock formations, is returned toward the surface and is detected by sensors on the one or more streamers. The detected energy is used to infer certain properties of the subsurface rock, such a structure, mineral composition and fluid content, thereby providing information useful in the recovery of hydrocarbons.

Current electromagnetic survey techniques are generally based on a two-dimensional arrangement with a survey vessel towing a single streamer. As the streamer is pulled through the water, one or more hydrodynamic depressors can be used to pull the streamer down to a pre-selected depth. The length of the lead-in cable interconnecting the streamer with the survey vessel can be adjusted to regulate depth of the streamer. More fine depth adjustments can be made with commercially available depth control devices cooperatively engaged with the streamer.

For electromagnetic surveying, it can be important that a streamer is maintained as close as possible to a selected depth profile in the water. For example, it may be important to increase the towing depth with an optimum depth being as close as possible to the seafloor while keeping the streamer as level as possible. This towing arrangement should reduce noise originating from towing the streamer through the water. Another important issue in electromagnetic surveying is cross-line sensitivity. In general, cross-line sensitivity is the distance in the horizontal plane perpendicular to the streamer direction of travel where the sensitivity drops below a detectable limit. In seismic surveying, cross-line sensitivity has been addressed by use of a three-dimensional survey arrangement in which multiple streamers are towed at selected lateral distances from one another. Spreading devices are used in seismic surveying to achieve the desired lateral spread between the streamers, thus improving the cross-line sensitivity of the seismic survey. However, the streamers in the seismic surveys are typically towed at shallow depths (e.g., <20 m), which would result in low sensitivity due to streamer distance from the seafloor if used in an electromagnetic survey.

Accordingly, there is a need for improved methods and systems for controlling depth and spread in geophysical surveys to, for example, increase cross-line sensitivity while keeping the streamer as close to the seafloor as possible.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine geophysical surveying. More particularly, in one or more embodiments, this invention relates to towing methods and systems for controlling spread and/or depth in a geophysical survey.

One of the many potential advantages of the systems and methods of the present invention, only some of which are disclosed herein, is that a marine electromagnetic survey system may be used in a three-dimensional survey arrangement. For example, it is believed that submersible deflectors may be used to achieve the desired spread between streamers in an electromagnetic survey while the streamers are maintained at a greater depth than has been obtainable heretofore. In certain embodiments, hydrodynamic depressors may also be deployed to further increase the towing depth of the streamers. In one embodiment, the methods and systems may be used to tow streamers at a depth of at least about 25 meters and at a depth of at least about 100 meters, in another embodiment. In one particular embodiment, the streamers may be towed at a depth up to about 500 meters or more. In one embodiment, the methods and systems may be used to achieve a spread between outer streamers of at least about 150 meters, at least about 500 meters in another embodiment, and at least about 1,000 meters in yet another embodiment. In one particular embodiment, the methods and systems may be used to achieve a spread between outer streamers up to about 1,500 meters. Accordingly, embodiments of the methods and systems may provide improved operating efficiencies for a marine electromagnetic survey system by, for example, increasing cross-line sensitivity due to the lateral spread and reducing signal noise by increasing the depth at which the streamers can be towed. In addition, embodiments of the methods and systems may enable measurement of cross-line field components as multiple streamers may be employed.

Figure 1:
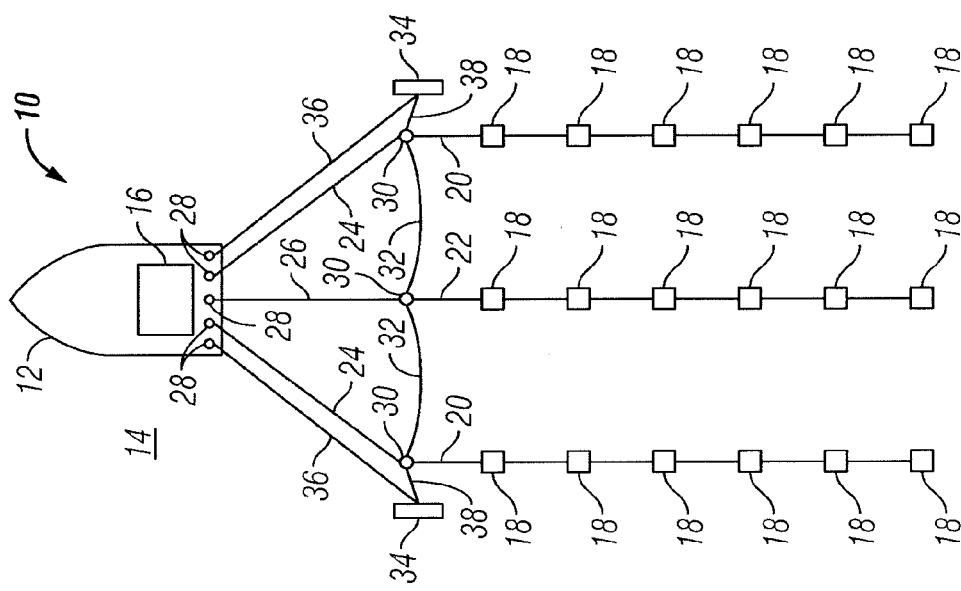
FIG. 1 is a schematic diagram illustrating a marine electromagnetic survey system comprising submersible deflectors and three streamers in accordance with one embodiment of the present invention.

FIG. 1 illustrates a marine electromagnetic survey system 10 in accordance with one embodiment of the present invention. In the illustrated embodiment, the system 10 may include a survey vessel 12 that moves along the surface of a body of water 14, such as a lake or ocean. The vessel 12 includes thereon equipment, shown generally at 16 and collectively referred to herein as a "recording system." The recording system 16 may include devices (none shown separately) for determining geodetic position of the vessel (e.g., a global positioning system satellite receiver signal), detecting and making a time indexed record of signals generated by each of electromagnetic sensors 18 (explained further below), and actuating one or more energy sources (not shown) at selected times. The energy sources may be any selectively actuable sources suitable for subsurface electromagnetic surveying, such as one or more electromagnetic field transmitters. The energy sources may be towed in any suitable pattern for electromagnetic surveying, including in a parallel or orthogonal pattern.

The electromagnetic sensors 18 may be any sensor suitable for subsurface electromagnetic surveying. By way of example, the electromagnetic sensors 18 may include, without limitation, any of a variety of electromagnetic field sensors, such as electrodes, magnetic field sensors, or magnetometers. The electromagnetic sensors 18 may generate response signals, such as electrical or optical signals, in response to detecting energy emitted from the source after it has interacted with rock formations (not shown) below the water bottom (not shown).

As illustrated by FIG. 1, the system 10 may further include laterally spaced apart streamers, such as outer streamers 20 and inner streamer 22, on which the electromagnetic sensors 18 may be disposed at spaced apart locations. "Lateral" or "laterally," in the present context, means transverse to the direction of the motion of the survey vessel 12. In the illustrated embodiment, the system 10 includes two outer streamers 20 and a single inner streamer 22. The outer streamers 20 and inner streamer 22 may each be formed, for example, by coupling a plurality of streamer segments end-to-end as explained in U.S. Pat. No. 7,142,481, the disclosure of which is incorporated herein by reference. In one embodiment, the outer streamers 20 and the inner streamer 22 may each include a lateral force and depth ("LFD") control device (not shown). The LFD control devices may be deployed, for example, to regulate streamer depth so that the outer streamers 20 and the inner streamer 22 may be kept as level as possible while towed through the water 14. The LFD control device may be any of a variety of different devices suitable for regulating streamer depth, including "birds" having variable-incidence wings. One example of an LFD control device is described in U.S. Patent Application No. 2008/0192570, the disclosure of which is incorporated herein by reference. It should be noted that, while the present example, shows only three streamers, the invention is applicable to any number of laterally spaced apart streamers towed by survey vessel 12 or any other vessel. For example, in some embodiments, 8 or more laterally spaced apart streamers may be towed by survey vessel 12, while in other embodiments, up to 26 laterally spaced apart streamers may be towed by survey vessel 12.

In an embodiment, the outer streamers 20 and the inner streamer 22 may be coupled directly to the survey vessel 12 using a corresponding lead-in line, such as outer lead-in lines 24 and inner lead-in line 26. In the illustrated embodiment, the outer lead-in lines 24 and the inner lead-in line 26 are used, for example, to deploy the outer streamers 20 and the inner streamer 22 from the survey vessel 12 and to maintain the outer streamers 20 and the inner streamer 22 at a selected distance behind the vessel 12. As illustrated, each of the outer lead-in lines 24 may be coupled at one end to the survey vessel 12 and at the other end to the corresponding outer streamer 20. In a similar manner, the inner lead-in line 26 may be coupled at one end to the survey vessel 12 and at the other end to the inner streamer 22. Each of the outer lead-in lines 24 and the inner lead-in line 26 may be deployed by a respective winch 28, or similar spooling device, disposed on the vessel 12, such that the length of each of the outer lead-in lines 24 and inner lead-in line 26 may be changed, for example. The outer lead-in lines 24 and the inner lead-in line 26 may be, for example, any of a variety of spoolable lines suitable for use in electromagnetic survey systems, including, without limitation, fiber ropes, armored cables, or any similar device or combination thereof. In some embodiments, the outer lead-in lines 24 and the inner lead-in line 26 may transmit towing force from the vessel 12 to the outer streamers 20 and the inner streamer 22. In some embodiments, the outer lead-in lines 24 and inner lead-in lines 26 may communicate power and/or signals between the recording system 16 and the various electronic components (e.g., electromagnetic sensors 18) on the outer streamers 20 and the inner streamer 22. For example, lead-in terminations 30 may be disposed at an axial end furthest away from the vessel 12 ("distal end") of each of the outer lead-in lines 24 and the inner lead-in lines 26. Electrical and/or optical connection between the recording system 16 and electrical components on the outer streamers 20 and the inner streamer 22 may be made through the lead-in terminations 30 using the outer lead-in lines 24 and the inner lead-in lines 26.

In the illustrated embodiment, the outer streamers 20 and inner streamer 22 are coupled at their forward ends to one or more spreader lines 32, which extend between outer streamers 20. As illustrated, the spreader lines 32 may interconnect the outer streamers 20 and the inner streamer 22. In general, the spreader lines 32 may extend in the water 14 transversely to the direction of motion of the survey vessel 12 and, for example, when maintained in correct tension, should help to maintain the lateral positions of the forward ends of the outer streamers 20 and inner streamer 22. The spreader lines 32 may be, for example, any of a variety of lines suitable for use in electromagnetic survey systems, including, without limitation, fiber ropes, armored cables, or any similar device or combination thereof. In one embodiment, the spreader lines 32 may include hydrodynamic depressors (e.g., hydrodynamic depressors 52 shown on FIG. 5) disposed thereon. The hydrodynamic depressors may be deployed on the spreader lines 32, for example, to provide downward thrust on the spreader lines 32, thereby forcing down the forward ends of the outer streamers 20 and inner streamer 22. The hydrodynamic depressors may be any of a variety of different devices for forcing down the spreader lines 32, including depth control foils. A non-limiting example of a hydrodynamic depressor is described below with reference to FIG. 6.

The system 10 may further include submersible deflectors 34 in accordance with embodiments of the present invention. As illustrated, the outer streamers 20 are each coupled to a corresponding one of the submersible deflectors 34. In one embodiment, spur lines 38 couple the outer streamers 20 to the submersible deflectors 34. The spur lines 38 may be any of a variety of lines suitable for use in electromagnetic survey systems, including, without limitation, fiber ropes, armored cables, or any similar device or combination thereof.

In accordance with present embodiments, the submersible deflectors 34 do not have a surface reference (e.g., attached buoy or other flotation device) and are free to move on a vertical plane. In some embodiments, the submersible deflectors 34 may be configured to have a negative buoyancy. For example, the submersible deflectors 34 may have a weight that is at least $\frac{1}{3}$ the lift force generated as the submersible deflectors 34 are towed through the water at a speed of about 2 to about 6 knots. It should be noted that, while the present example shows only two submersible deflectors 34, the invention is applicable to any number of submersible deflectors 34 that may be used as desired for a particular application. For example, while not illustrated, more than two submersible deflectors 34 may be used in embodiments where more than three streamers are used. A non-limiting example of a structure suitable for a submersible deflector 34 is described below with respect to FIGS. 7-10. In present embodiments, the submersible deflectors 34 are each shaped to provide a lateral component of force to the corresponding outer streamers 20 as the submersible deflectors 34 are moved through the water 14. By way of example, the submersible deflectors 34 may comprise one or more foils that create lateral thrust as the submersible deflectors 34 are moved through the water 14. In one embodiment, the foils also are configured to create vertical thrust as they are moved through the water. Submersible deflectors that may be used, in certain embodiments, include two-foil or three-foil deflectors.

The lateral component of motion of each of the submersible deflectors 34 is opposed to that of the other of the submersible deflectors 34, and is generally, for example, in a direction transverse to the direction of the motion of the vessel 12. The combined lateral motion of the submersible deflectors 34 separates the submersible deflectors 34 from each other until they place the outer streamers 20 in selected lateral positions. In one example, the separation is selected to place tension in the spreader lines 32. In one embodiment, the submersible deflectors 34 also have a downward component of motion to force the outer streamers 20 downward in the water 14 to a selected depth. Due to tension in the spreader lines 32, the inner streamer 22 should also be placed at the selected depth. It should be understood that the spreader lines 32 may be interconnected across the entire span between the submersible deflectors 34, or in another embodiment may be separated. As will be discussed in more detail below, the yaw and roll angles of the submersible deflectors 34 may be controlled to obtain a selected depth and spread in accordance with embodiments of the present invention. The "yaw angle," which is sometimes referred to as the "angle of attack," refers to the rotation angle about the vertical axis in relation to the heading of a particular submersible deflector 34 as it is towed through the water 14. The yaw angle can be adjusted to modify the lateral thrust generated by the particular submersible deflector 34, thus increasing or decreasing the spread as desired for a particular application. In addition, as the submersible deflector 34 is not connected to a surface reference, adjusting the yaw angle may also result in a new equilibrium, which may be at a different depth. The "roll angle," sometimes referred to as the "heel angle," refers to the rotation angle along the longitudinal axis in the relation to the vertical axis. The roll angle can be adjusted to modify the vertical thrust generated by the particular submersible deflector 34, thus increasing or decreasing the depth as desired for a particular application. In one embodiment, signals may be sent from the recording system 16 to control the yaw and roll angles of the submersible deflectors 34.

In an embodiment, the submersible deflectors 34 may be coupled directly to the survey vessel 12 using deflector tow lines 36. In the illustrated embodiment the deflector tow lines 36 are used, for example, to deploy the submersible deflectors 34 from the survey vessel 12 and to maintain the submersible deflectors 34 at a selected distance behind the vessel 12. In one embodiment, the length of the deflector tow lines 36 may be controlled to obtain a desired depth as the submersible deflectors 34 are towed through the water 14. As illustrated, each of the deflector tow lines 36 may be coupled at one end to the survey vessel 12 and at the other end to the corresponding one of the submersible deflectors 34. Each of the deflector tow lines 36 may be deployed by a respective winch 28, or similar spooling device, disposed on the vessel 12, such that the length of each of the deflector tow lines 36 may be changed, for example. The outer deflector tow lines 36 may be, for example, any of a variety of spoolable lines suitable for use in electromagnetic survey systems, including, without limitation, fiber ropes, armored cables, or any similar device or combination thereof. In some embodiments, the deflector tow lines 36 may transmit towing force from the vessel 12 to the submersible deflectors 34. In some embodiments, the deflector tow lines 36 may communicate power and/or signals between the recording system 16 and the various electronic components of the system 10.

Figure 2:
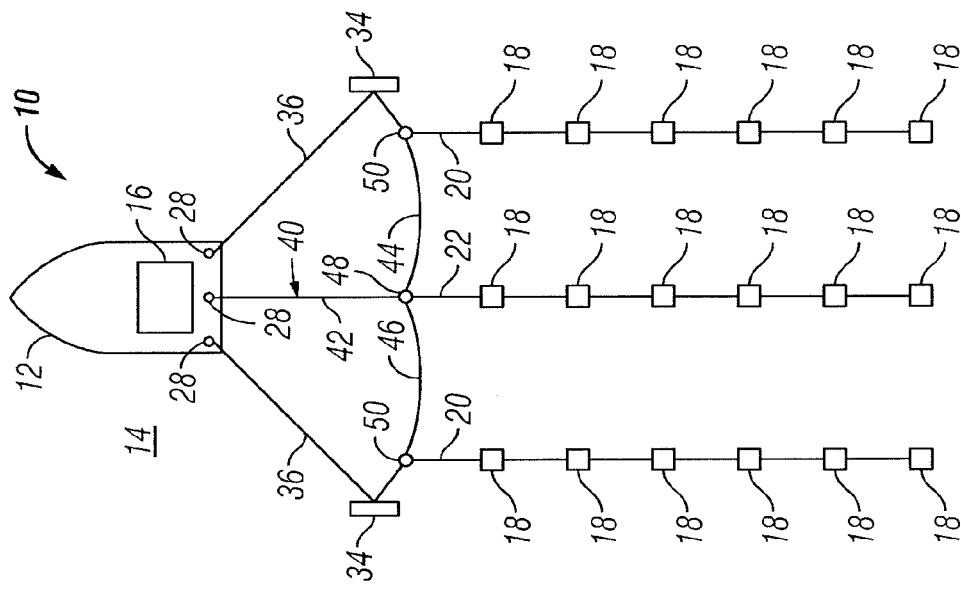
FIG. 2 a schematic diagram illustrating a marine electromagnetic survey system comprising submersible deflectors and a multi-tow lead-in cable branching into three streamers in accordance with one embodiment of the present invention.

FIG. 2 illustrates a marine electromagnetic survey system 10 that utilizes a multi-tow lead-in line 40 to couple the outer streamers 20 and the inner streamer 22 to the survey vessel 12 in accordance with embodiments of the present invention. As illustrated, the system 10 may include a survey vessel 12 that moves along the surface of a body of water 14, wherein the vessel 12 includes recording system 16 and winches 28. The system 10 may further include laterally spaced apart streamers, such as outer streamers 20 and an inner streamer 22, on which electromagnetic sensors 18 may be disposed at spaced apart locations. The system 10 may further include submersible deflectors 34, which are each coupled to a corresponding one of the outer streamers 20. In accordance with present embodiments, the submersible deflectors 34 may create lateral and vertical thrust as they are moved through the water 14 to obtain a selected depth and spread. Deflector tow lines 36 coupled to the winches 28 on the vessel 12 may be used, for example, to deploy the submersible deflectors 34 from the survey vessel 12 and to maintain the submersible deflectors 34 at a selected distance behind the vessel 12.

Rather than using separate lead-in lines that are each directly coupled to the survey vessel 12, a multi-tow lead-in line 40 is used to couple the outer streamers 20 and the inner streamer 22 to the vessel 12 in the embodiment illustrated by FIG. 2. For example, the multi-tow lead-in 40 may be used to deploy the outer streamers 20 and the inner streamer 22 from the survey vessel 12 and to maintain the outer streamers 20 and the inner streamer 22 at a selected distance behind the vessel 12.

As illustrated, the multi-tow lead-in line 40 includes a primary line 42 and branches 44, 46 that extend from the distal end of the primary line 42 at the primary line termination 48. The primary line 42 may be coupled at one end to the survey vessel 12 and at the other end to the inner streamer 22. The branches 44, 46 may each be coupled at one end to one of the outer streamers 20 and at the other end to the primary line 42. In the illustrated embodiment, spreader lines (e.g., spreader lines 32 shown on FIG. 1) are not used to interconnect the inner streamer 22 and the outer streamers 20. While not illustrated, hydrodynamic depressors (e.g., hydrodynamic depressor 52 shown on FIG. 6) may be deployed on the multi-tow lead-in, in certain embodiments. Where used, the hydrodynamic depressors may be coupled, for example, to the branches 44, 46 proximate to the primary line termination 48. The multi-tow lead-in line 40 may be deployed by a respective winch 28, or similar spooling device, disposed on the vessel 12, such that the length of the multi-tow lead-in line 40 may be changed, for example. The multi-tow lead-in line 40 may be, for example, any of a variety of spoolable lines suitable for use in electromagnetic survey systems, including, without limitation, fiber ropes, armored cables, or any similar device or combination thereof. In some embodiments, the multi-tow lead-in line 40 may transmit towing force from the vessel 12 to the outer streamers 20 and the inner streamer 22. In some embodiments, the multi-tow lead-in line 40 may communicate power and/or signals between the recording system 16 and the various electronic components (e.g., electromagnetic sensors 18) on the outer streamers 20) and the inner streamer 22. For example, branch terminations 50 and primary line termination 48 may be disposed at the distal end of the primary line 42, and the branch terminations 50 may be at the end of corresponding branches 44, 46 that is opposite the primary line termination 48. Electrical and/or optical connection between the recording system 16 and electrical components on the outer streamers 20 and the inner streamer 22 may be made through the branch terminations 50 and primary line termination 48 using the primary line 42 and branches 44, 46.

Figure 3:
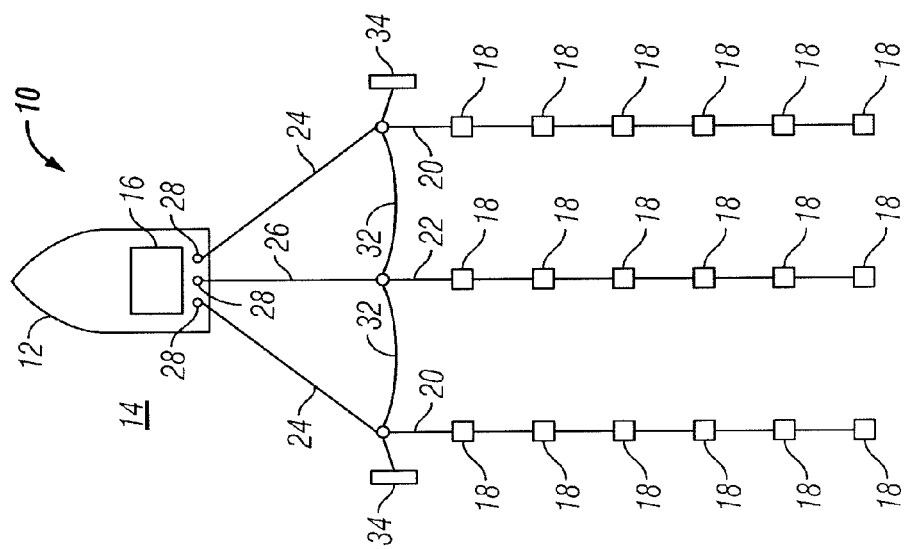
FIG. 3 a schematic diagram illustrating a marine electromagnetic survey system comprising submersible deflectors and three streamers without deflector tow ropes in accordance with one embodiment of the present invention.

FIG. 3 illustrates a marine electromagnetic survey system 10 that utilizes outer lead-in lines 24 to interconnect the submersible deflectors 34 to the survey vessel 12 in accordance with embodiments of the present invention. As illustrated, the system 10 may include a survey vessel 12 that moves along the surface of a body of water 14, wherein the vessel 12 includes recording system 16 and winches 28. The system 10 may further include laterally spaced apart streamers, such as outer streamers 20 and an inner streamer 22, on which electromagnetic sensors 18 may be disposed at spaced apart locations. The outer streamers 20 and the inner streamer 22 may be coupled, for example, directly to the survey vessel 12 using a corresponding lead-in line, such as outer lead-in lines 24 and inner lead-in line 26. In embodiments, the outer lead-in lines 24 and the inner lead-in line 26 are used, for example, to deploy the outer streamers 20 and the inner streamer 22 from the survey vessel 12 and to maintain the outer streamers 20 and the inner streamer 22 at a selected distance behind the vessel 12. As illustrated, the outer streamers 20 and inner streamer 22 may be coupled at their forward ends to one or more spreader lines 32, which extend between outer inner streamers 20. In certain embodiments, hydrodynamic depressors (e.g., hydrodynamic depressors 32 shown on FIG. 5) may be deployed on the spreader lines 32. The system 10 may further include submersible deflectors 34, which are each coupled to a corresponding one of the outer streamers 20. In accordance with present embodiments, the submersible deflectors 34 may create lateral and vertical thrust as they are moved through the water 14 to obtain a selected depth and spread. Rather than using separate deflector tow lines 36 (e.g., shown on FIGS. 1 and 2), the outer lead-in lines 24 couple the submersible deflectors 34 to the survey vessel 12.

Figure 4:
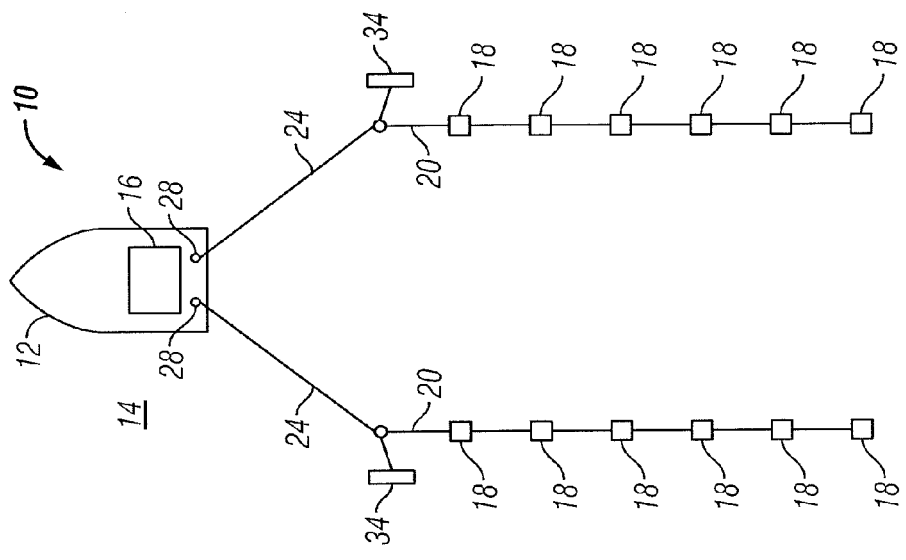
FIG. 4 a schematic diagram illustrating a marine electromagnetic survey system comprising submersible deflectors and two streamers without a spreader cable extending between the streamers in accordance with one embodiment of the present invention.

FIG. 4 illustrates a marine electromagnetic survey system 10 that includes only outer streamers 20 in accordance with embodiments of the present invention. As illustrated, the system 10 may include a survey vessel 12 that moves along the surface of a body of water 14, wherein the vessel 12 includes recording system 16 and winches 28. The system 10 may further include laterally spaced apart outer streamers 20 on which electromagnetic sensors 18 may be disposed at spaced apart locations. In contrast to the previously described embodiments, the system 10 in this example does not include a central streamer 22 (e.g., shown on FIGS. 1-3). In addition, the system 10 also does not include spreader lines 32 (e.g., shown on FIGS. 1 and 3) or other similar lines for maintaining the spread between the outer streamers 20. The outer streamers 20 may be coupled, for example, directly to the survey vessel 12 using outer lead-in lines 24. In embodiments, the outer lead-in lines 24 are used, for example, to deploy the outer streamers 20 from the survey vessel 12 and to maintain the outer streamers 20 at a selected distance behind the vessel 12. The system 10 may further include submersible deflectors 34, which are each coupled to a corresponding one of the outer streamers 20. In accordance with present embodiments, the submersible deflectors 34 may create lateral and vertical thrust as they are moved through the water 14 to obtain a selected depth and spread. Rather than using separate deflector tow lines 36 (e.g., shown on FIG. 1), the outer lead-in lines 24 interconnect the submersible deflectors 34 to the survey vessel 12. Alternatively, separate deflector tow lines 36 may be employed to deploy the submersible deflectors 34 from the survey vessel 12.

Figure 5:
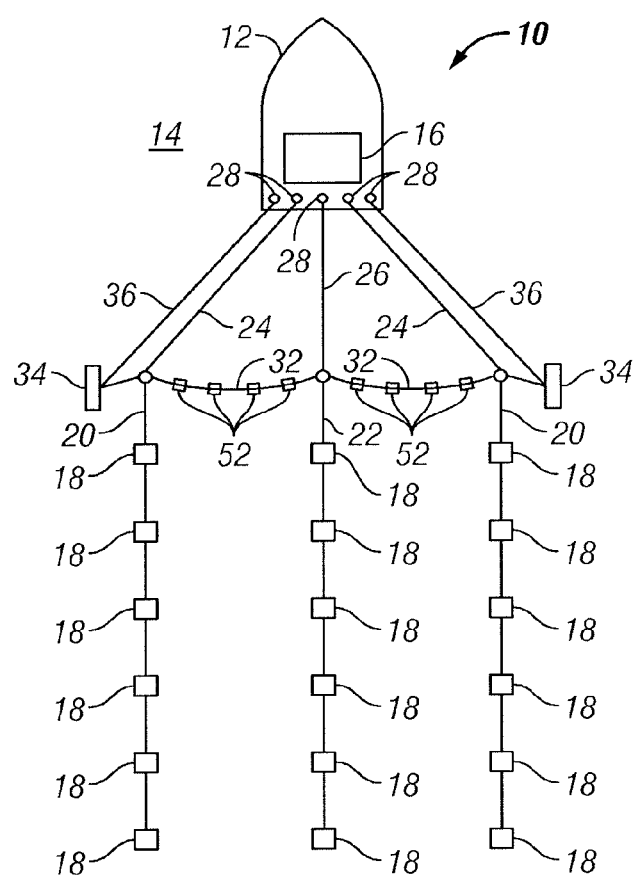
FIG. 5 a schematic diagram illustrating a marine electromagnetic survey system comprising submersible deflectors and hydrodynamic depressors in accordance with one embodiment of the present invention.

FIG. 5 illustrates a marine electromagnetic survey system 10 in which hydrodynamic depressors 52 have been employed in accordance with embodiments of the present invention. As previously described, hydrodynamic depressors 52 may be used, for example, to provide downward thrust to force down the forward ends of the outer streamers 20 and inner streamer 22. In the illustrated embodiment, the hydrodynamic depressors 52 have been installed on the one or more spreader lines 32. It should be understood that hydrodynamic depressors 52 may also be used in alternative embodiments of the system 10 (e.g., the systems 10 shown on FIGS. 2 and 3). While not illustrated, the hydrodynamic depressors 52, in one embodiment, may be placed on the branches of a multi-tow lead-in line 40 (e.g., branches 44 and 46 of the multi-tow lead-in 40 shown on FIG. 2).

Figure 6:
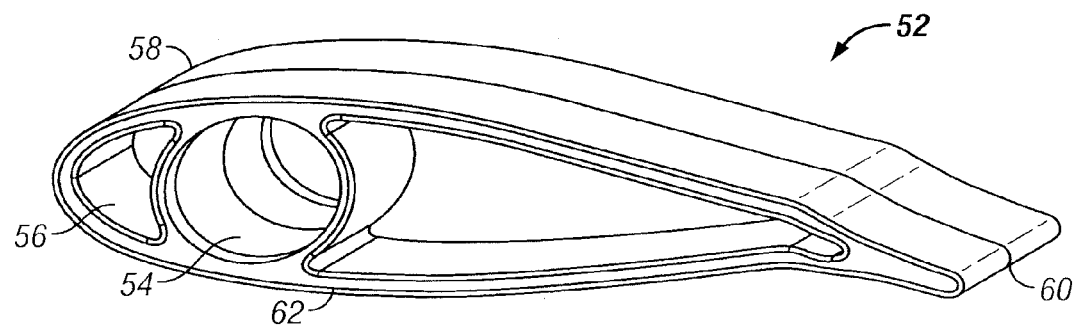
FIG. 6 is a perspective view of a hydrodynamic depressor in accordance with one embodiment of the present invention.

FIG. 6 illustrates a hydrodynamic depressor 52 that may be employed in accordance with embodiments of the present invention. As illustrated, the hydrodynamic depressor 52 is a depth control foil that includes an opening 54 proximate the forward (with respect to the direction of motion through the water) end 56 for coupling the depressor 52 on the spreader line 32 (e.g., shown FIG. 5). The forward end 56 of the depressor 52 may be shaped to reduce hydrodynamic drag as the survey system 10 (see, e.g., FIG. 5) is towed through the water. The depressor 52 may include a curved upper surface 58 and a tail 60 that extends from the upper surface 58 of the depressor 52. The respective lengths of the upper surface 58, the tail 60, and the lower surface 62 of the depressor are configured to generate the desired hydrodynamic force. Those of ordinary skill in the art with the benefit of this disclosure will recognize that the present invention is not limited to the hydrodynamic depressors illustrated by FIG. 6, but is broad enough to include other devices suitable for forcing down a spreader line 32, such as a weighted rope, for example.

Figure 7:
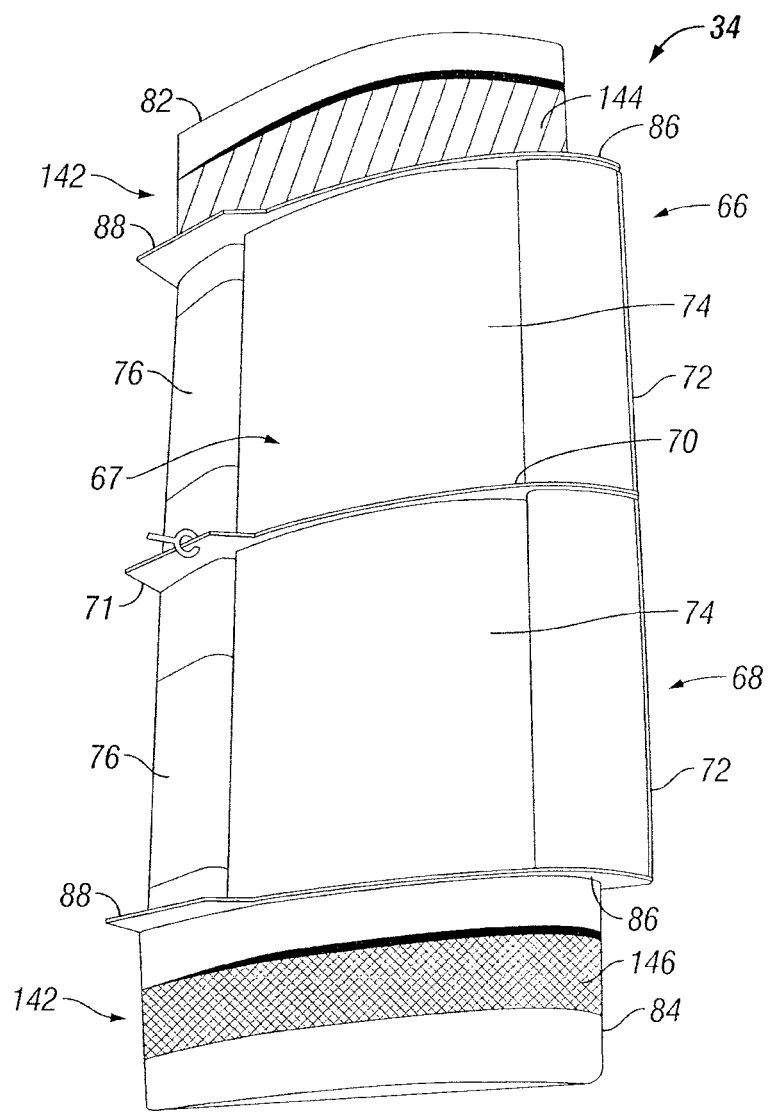
FIG. 7 is a rear perspective view of a submersible deflector in accordance with one embodiment of the present invention.
Figure 8:
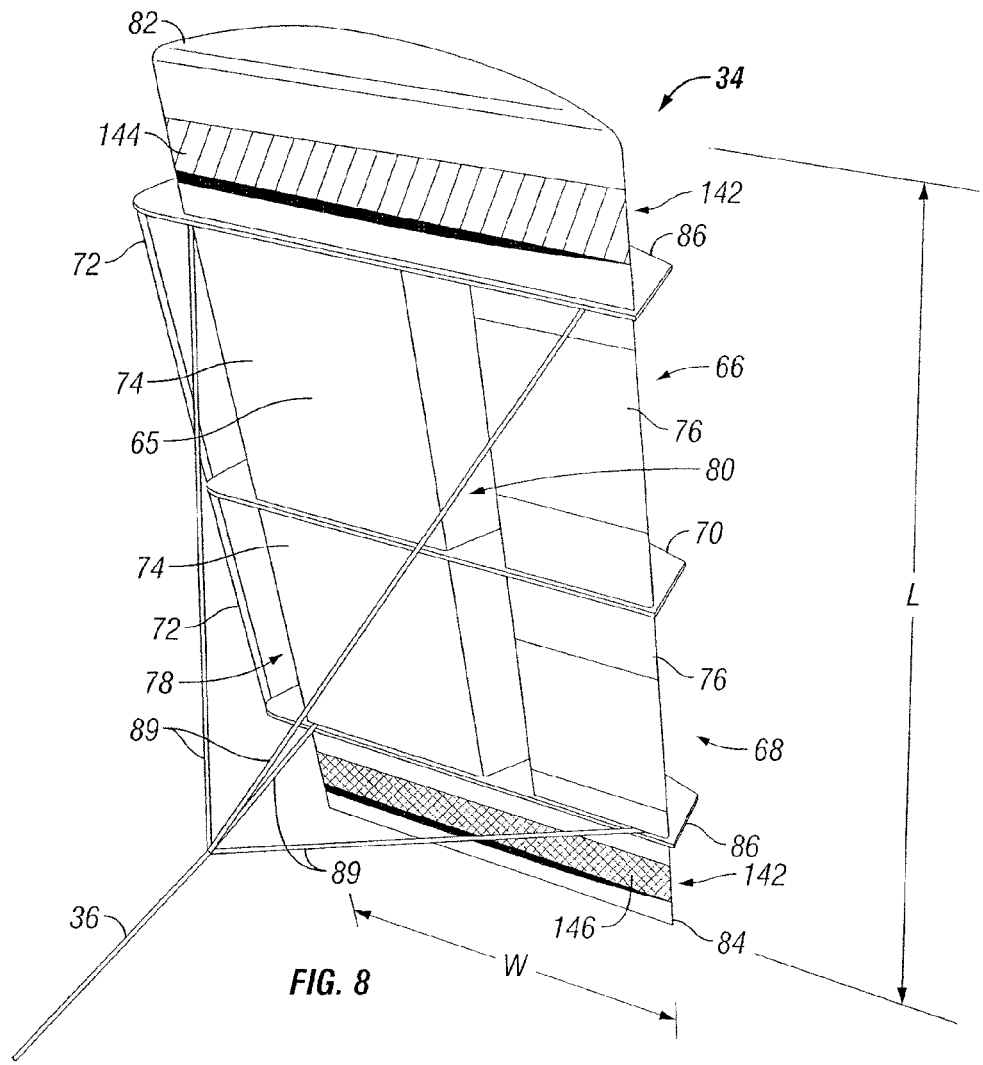
FIG. 8 is a front perspective view of a submersible deflector in accordance with one embodiment of the present invention.

FIGS. 7-8 illustrate a submersible deflector 34 that may be used in accordance with embodiments of the present invention. In the illustrated embodiment, the submersible deflector 34 may have a front side 65 (FIG. 8) and a rear side 67 (FIG. 7). As illustrated, the submersible deflector 34 may comprise an upper submersible deflector portion 66 and a lower submersible deflector portion 68 joined together by a center plate 70. The center plate 70 may comprise a fin 71 that projects from the rear side 67 of the submersible deflector 34, as illustrated in FIG. 7. In one embodiment (not illustrated), the upper submersible deflector portion 66 and the lower submersible deflector portion 68 are coupled without a center plate 70. Each of the submersible deflector portions 66, 68 comprises a first foil 72, a second foil 74, and a third foil 76. In an embodiment, the foils 72, 74, 76 may each be constructed from a material comprising stainless steel or other suitable material. In the illustrated embodiment of FIG. 8, a first slot 78 is defined between first foil 72 and second foil 74 of each of the submersible deflector portions 66, 68 with the first slot 78 extending substantially the entire length of the first foil 72 and the second foil 74. A second slot 80 may be defined between second foil 74 and third foil 76 of each of the submersible deflector portions 66, 68, with the second slot 80 extending substantially the entire length of the second foil 74 and the third foil 76. As the submersible deflector 34 is towed, water may pass through the first slot 78 and second slot 80, exerting hydrodynamic force on the foils 72, 74, 76.

As illustrated, the upper submersible deflector portion 66 comprises a top wing section 82 at the top end of the submersible deflector 34, and the lower submersible deflector portion 68 comprises a lower wing section 84 at the lower end of the submersible deflector 34. The foils 72, 74, 76 of each of the submersible deflector portions 66, 68 may extend longitudinally between the top wing section 82 and the lower wing section 84. In the illustrated embodiment, plates 86 separate the wing sections 82, 84 and the foils 72, 74, 76 in each of the submersible deflector portions 66, 68. In an embodiment, the foils 72, 74, 76 of the upper submersible deflector portion 66 are fixed to the center plate 70 on one end and to one of the plates 86 on the other end, and the foils 72, 74, 76 of the lower submersible deflector portion 68 are fixed to the center plate 70 on one end and to one of the plates 86 on the other end. Each of the plates 86 may have a fin 88 that projects from the rear side 67 of the submersible deflector 34, as illustrated in FIG. 7.

A number of different techniques may be used to couple the submersible deflector 34 to the survey vessel 12 (e.g., shown on FIGS. 1-4). As illustrated by FIG. 8, a bridle comprising bridle lines 89 may be used to couple the submersible deflector 34 to the deflector tow line 36. As illustrated, the bridle lines 89 may each be coupled to a corresponding point on one of the plates 86. Those of ordinary skill in the art with the benefit of this disclosure should be able to select an appropriate technique for coupling the submersible deflector 34 to a deflector tow line 36.

The submersible deflector 34 may have an aspect ratio (i.e., submersible deflector length L relative to submersible deflector width W) that is suitable for a particular application. In an embodiment, the submersible deflector 34 may have an aspect ratio of at least about 1.5:1. In another embodiment, the submersible deflector 34 may have an aspect ratio of at least about 2:1 and at least about 3:1, in yet another embodiment. Those of ordinary skill in the art with the benefit of this disclosure should be able to select an appropriate aspect ratio for a particular application.

Figure 9:
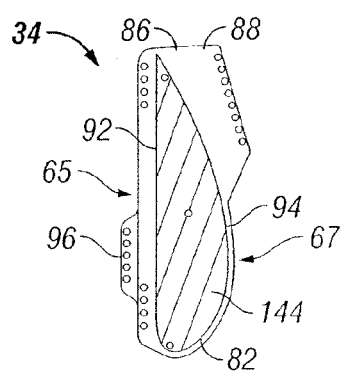
FIG. 9 is a top end view of a submersible deflector in accordance with one embodiment of the present invention.

FIG. 9 is a top end view of the submersible deflector 34 of FIGS. 7-8 in accordance with one embodiment of the present invention. As illustrated, the upper fin section 82 may have a flat inner (towards the towing vessel) side surface 92 and a convex outer (away from the towing vessel) side surface 94. In one embodiment, the upper fin section 82 has an interior chamber 142 that may contain a selected material. For example, the interior chamber of the upper fin section 82 may contain a low density material 144 that is buoyant to give buoyancy to the upper fin section 82. Non-limiting examples of suitable low-density materials 144 that may be used include foam materials, such as Syntac® syntactic foam, available from Trellborg Offshore Boston, Inc., Mansfield Mass., and Divinylcell® foams, available from the DIAB Group. Those of ordinary skill in the art will appreciate that the volume of the interior chamber 142 may vary, depending on a number of factors including, for example, the size of the submersible deflector 34, the desired buoyancy, and the like. The interior chamber 142 may have a volume of about 0.1 m to about 3 $m^3$ in one embodiment, about 1 to about 2 $m^3$, in another embodiment, and about 1.5 to about 2 $m^3$, in yet another embodiment. In one particular embodiment, 1.66 $m^3$ of a foam (e.g., Divinylcell® foam) may be selected for placement in the interior chamber 142 to provide a 1T lift. In one embodiment, the upper fin section 82 may be constructed from a material comprising stainless steel. Those of ordinary skill in the art, with the benefit of this disclosure, will appreciate other suitable materials that may be used for the upper fin section 82.

As further illustrated by FIG. 9, the fin 88 of the plate 86 separating the upper fin section 82 and the foils 72, 74, 76 (e.g., shown on FIGS. 7-8) projects from the rear side 67 of the submersible deflector 34. The center plate 70 (e.g., shown on FIGS. 7-8) further may comprise a central tow point 96 projecting from the front side 65 of the submersible deflector 34.

Figure 10:
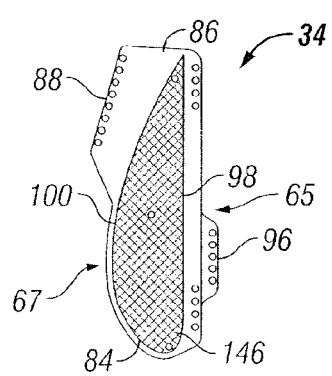
FIG. 10 is a bottom end view of a submersible deflector in accordance with one embodiment of the present invention.

FIG. 10 is a bottom end view of the submersible deflector 34 of FIGS. 7-8 in accordance with one embodiment of the present invention. As illustrated, the lower fin section 84 may have a flat inner side surface 98 and a convex outer side surface 100. In one embodiment, the lower fin section 84 has an interior chamber 142 that can be filled with a selected material. For example, the interior chamber 142 of the lower fin section 84 may be filled with a ballast material 146. Non-limiting examples of suitable ballast materials 146 include stainless steel plates. Those of ordinary skill in the art will appreciate that the volume of the interior chamber 142 may vary, depending on a number of factors including, for example, the size of the submersible deflector 34, the desired buoyancy, and the like. The interior chamber 142 may have a volume of about 0.05 m$^3$ to about 3 m$^3$, in one embodiment, about 0.1 to about 2 m$^3$, in another embodiment, and about 0.1 to about 1 m$^3$, in yet another embodiment. In one embodiment, the lower fin section 84 may be constructed from a material comprising stainless steel. Those of ordinary skill in the art, with the benefit of this disclosure, will appreciate other suitable materials that may be used for the lower fin section 84.

As further illustrated by FIG. 10, the fin 88 of the plate 86 separating the lower fin section 84 and the foils 72, 74, 76 (e.g., shown on FIGS. 7-8) projects from the rear side 67 of the submersible deflector 34. The center plate 70 (e.g., shown on FIGS. 7-8) further may comprise a central tow point 96 projecting from the front side 65 of the submersible deflector 34.

Figure 11:
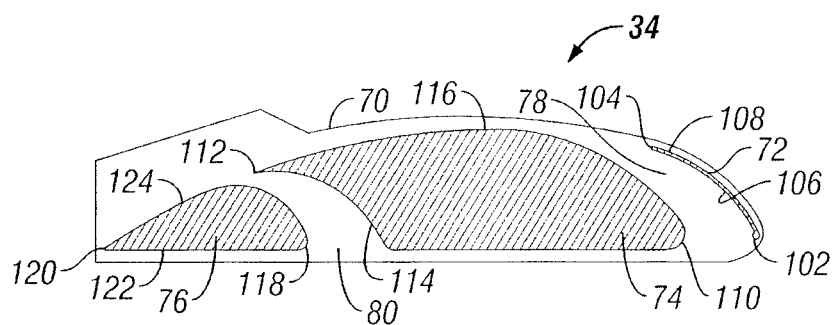
FIG. 11 is a cross-sectional view of a submersible deflector in accordance with one embodiment of the present invention.
Figure 12:
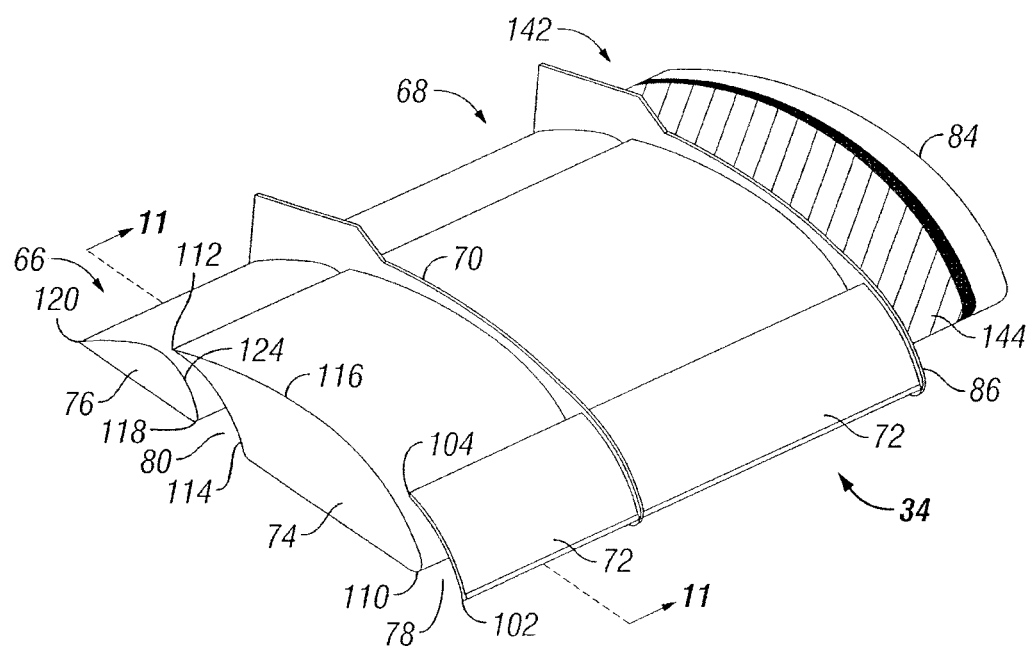
FIG. 12 is a perspective view of a submersible deflector in accordance with one embodiment of the present invention.

Turning now to FIGS. 11 and 12, the profile of the foils 72, 74, 76 will be discussed in more detail in accordance with one embodiment of the present invention. FIG. 11 is a cross-sectional view of the submersible deflector 34 of FIGS. 7-8 as taken along a horizontal line passing through the upper submersible deflector portion 66 (e.g., shown on FIG. 7) in accordance with one embodiment of the present invention. FIG. 12 is a perspective view of the submersible deflector 34 with the upper fin section 82 (e.g., shown on FIG. 7) removed in accordance with one embodiment of the present invention. With the upper fin section 82 removed, a clean view of the profile of the foils 72, 74, 76 of the upper submersible deflector portion 66 is illustrated in this example. As illustrated, the foils 72, 74, 76 may be attached to the center plate 70. While the foils 72, 74, 76 illustrated on FIGS. 11 and 12 have a specific profile, it should be understood that the present invention encompasses foils 72, 74, 76 having profiles that differ from those shown on FIGS. 11 and 12.

The first foil 72 may comprise a leading first foil edge 102, a trailing first foil edge 104, a first foil inner surface 106, and a first foil outer surface 108. In an embodiment, first foil inner surface 106 may be generally concave, and the first foil outer surface 108 may be generally convex, for example, so that the profile of the first foil 72 may be in the shape of an arc. In one embodiment, the widest point of the first foil 72 between the first foil inner surface 106 and the first foil outer surface 108 is less than about least 10% of the direct distance between the leading first foil edge 102 and the trailing first foil edge 104. In another embodiment, the widest point of the first foil 72 is about 0.1% to about 5% of the direct distance between the leading first foil edge 102 and the trailing first foil edge 104. In an embodiment, the first foil is formed from sheet metal.

In a similar manner to the first foil 72, the second foil 74 may comprise a leading second foil edge 110, a trailing second foil edge 112, a second foil inner surface 114, and a second foil outer surface 116. In an embodiment, the second foil inner surface 114 may be generally concave. In an embodiment, the second foil outer surface 116 may be generally convex. In one embodiment, the widest point of the second foil 74 between the second foil inner surface 114 and the second foil outer surface 116 is at about least 25% the direct distance between the leading second foil edge 110 and the trailing second foil edge 112. In another embodiment, the widest point of the second foil 74 is about 50% to about 100% of the direct distance between the leading second foil edge 110 and the trailing second foil edge 112, and about 60% to about 90% of the distance, in yet another embodiment.

In a similar manner to the first foil 72 and the second foil 74, the third foil 76 may comprise a leading third foil edge 118, a trailing third foil edge 120, a third foil inner surface 122, and third foil outer surface 124. In one embodiment, the leading third foil edge 118 is generally aligned with the leading second foil edge 110. In one embodiment, the widest point of the third foil 76 between the third foil inner surface 122 and the third foil outer surface 124 is at about least 25% the direct distance between the leading third foil edge 118 and the trailing third foil edge 120. In another embodiment, the widest point of the third foil 76 is about 25% to about 50% of the direct distance between the leading third foil edge 118 and the trailing third foil edge 120.

As illustrated by FIGS. 11 and 12, the first foil 72 may be located on one side of the second foil 74 with the third foil 76 located on the other side. The first foil 72 may have a leading edge 102 that is spaced from the leading edge 110 of the second foil 74. Because of the difference in profile between the inner surface 106 of the first foil and the outer surface 116 of the second foil 74, first slot 78 is formed. Accordingly, first slot 78 may be defined by the first foil 72 and the second foil 74 and extend along the length of the first foil 72 and the second foil 74. The third foil 76 has a leading edge 118 that is spaced from the second foil 74. Because of this spread and the difference in profile between the inner surface 114 of the second foil 74 and the outer surface 124 of the third foil 76, second slot 80 is formed. Accordingly second slot 80 may be defined by the second foil 74 and the third foil 76 and extend along the length of the second foil 74 and third foil 76. As can be seen in FIG. 11, the second slot 80 may decrease in area as it moves from the leading third foil edge 118 along the profile of the second foil 74.

Figure 13A:
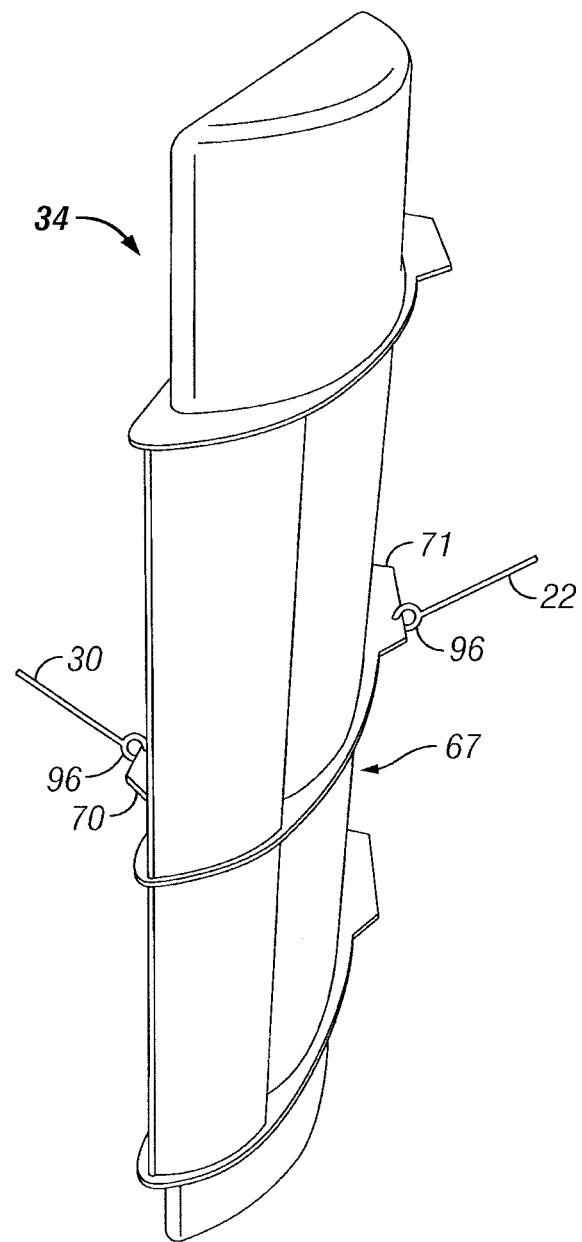
FIG. 13A is a perspective view of a submersible deflector coupled to a streamer in accordance with one embodiment of the present invention.
Figure 13B:
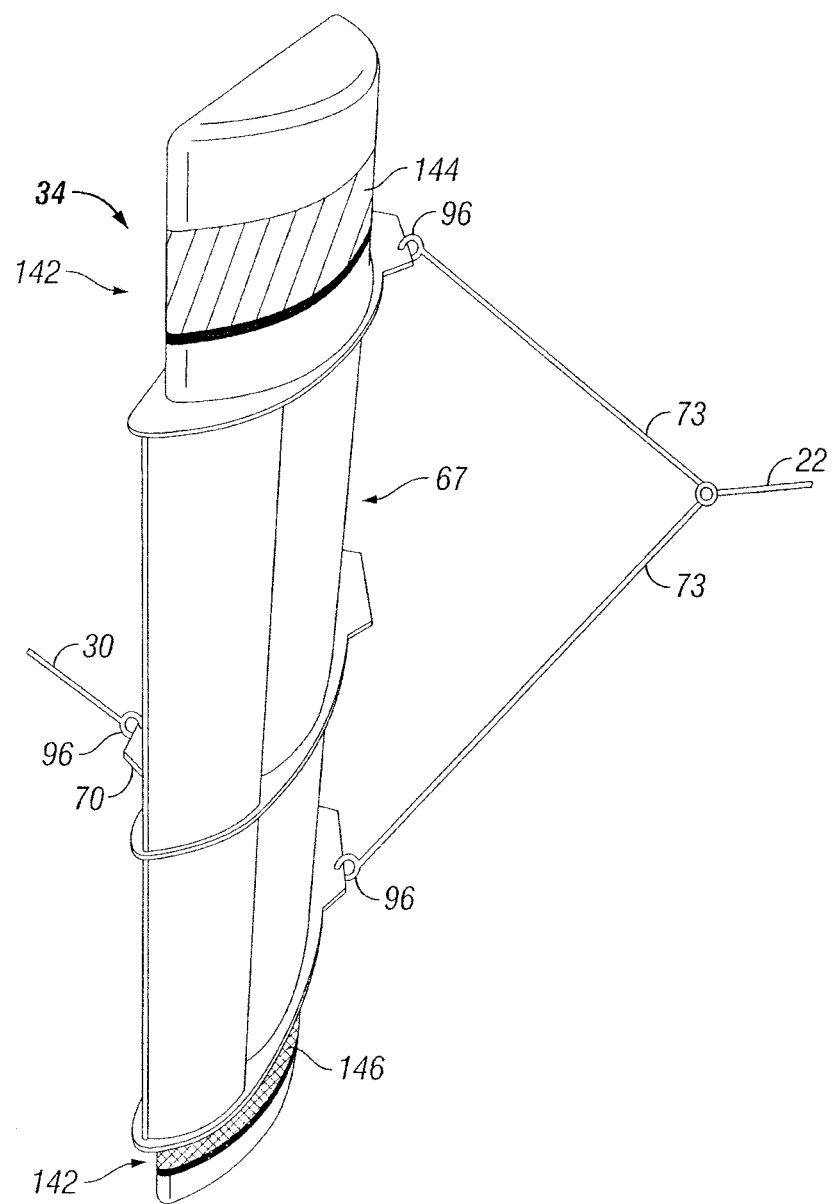
FIG. 13B is a perspective view of a submersible deflector coupled to a streamer in accordance with another embodiment of the present invention.

FIGS. 13A and 13B illustrate alternative embodiments of the present invention in which a streamer (e.g., one of the outer streamers 22 on FIGS. 1-5) may be towed from the rear side 67 of the submersible deflector 34. As illustrated, the outer streamer 22 may be coupled to the submersible deflector 34. In the illustrated embodiment of FIG. 13A, the streamer 22 may be coupled to a central tow point 96 on the fin 71 of the center plate 70 of the submersible deflector. In the illustrated embodiment of FIG. 13B, a bridle system comprising one or more bridle lines 73 may be used to interconnect the outer streamer 22 and the submersible deflector 34. As illustrated by FIG. 13B, each of the bridle lines 73 may be coupled to a central tow point 96 on a corresponding one of the plates 86. As illustrated by FIGS. 13A and 13B, the submersible deflector 34 may be coupled to a deflector tow line 36. In the illustrated embodiment, the deflector tow line 36 is attached to a central tow point 96 on the center plate 70 of the submersible deflector 34. Alternatively, a bridle system may be used to couple the deflector tow line 36 and the submersible deflector 34 as shown on FIG. 8. While not illustrated on FIGS. 13A and 13B, the deflector tow line 36 may be coupled to a survey vessel 12 (e.g., shown on FIGS. 1-4). Accordingly, the outer streamer 22 may be towed behind the submersible deflector 34 as the submersible deflector 34 is moved through the water 14 (see FIGS. 1-4).

As previously mentioned, the yaw and roll angles of the submersible deflectors may be adjusted in accordance with embodiments of the present invention. The yaw and roll angles of the submersible deflectors 34 may be adjusted using any of a variety of different techniques suitable for use in electromagnetic surveying. In one embodiment, the length of the bridle cables 89 (see FIG. 8) can be independently adjusted. For example, a controller (not illustrated) may be included for adjusting the length of the bridle cables 89. By changing the length of the bridle cables 89 with respect to one another, the yaw and/or roll angles of the submersible deflector 34 can be adjusted, for example, as explained in U.S. Pat. Nos. 7,404,370 and 7,881,153, the disclosures of which are incorporated herein by reference.

Figure 14:
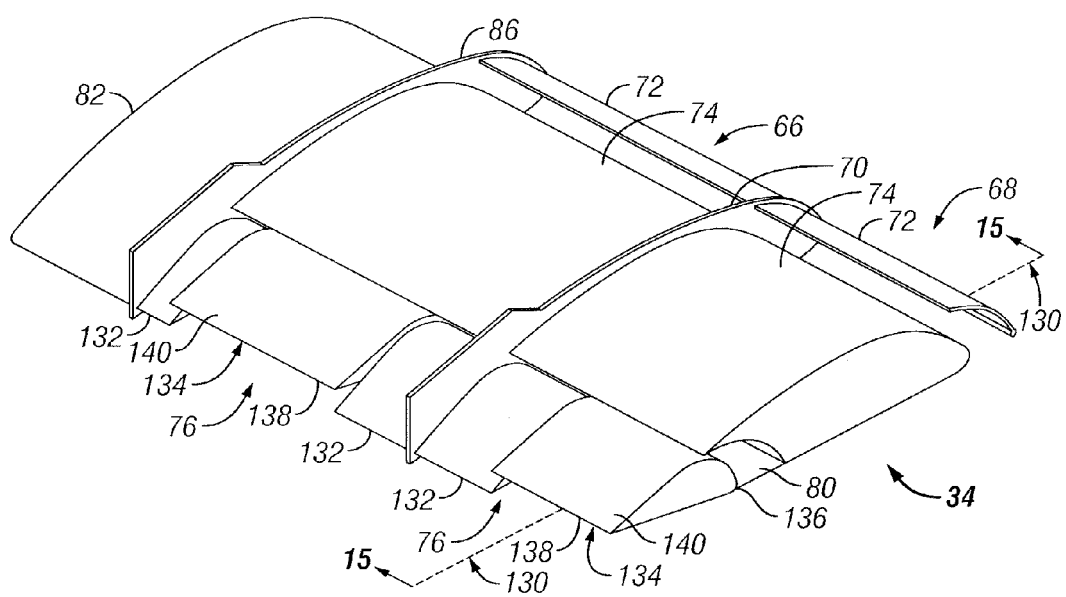
FIG. 14 is a perspective view of a submersible deflector comprising adjustable flaps in accordance with one embodiment of the present invention.
Figure 15:
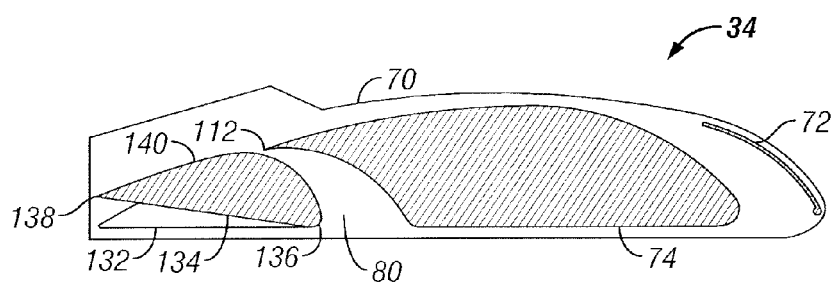
FIG. 15 is a cross-sectional view of a submersible deflector comprising adjustable flaps in accordance with one embodiment of the present invention.
Figure 16:
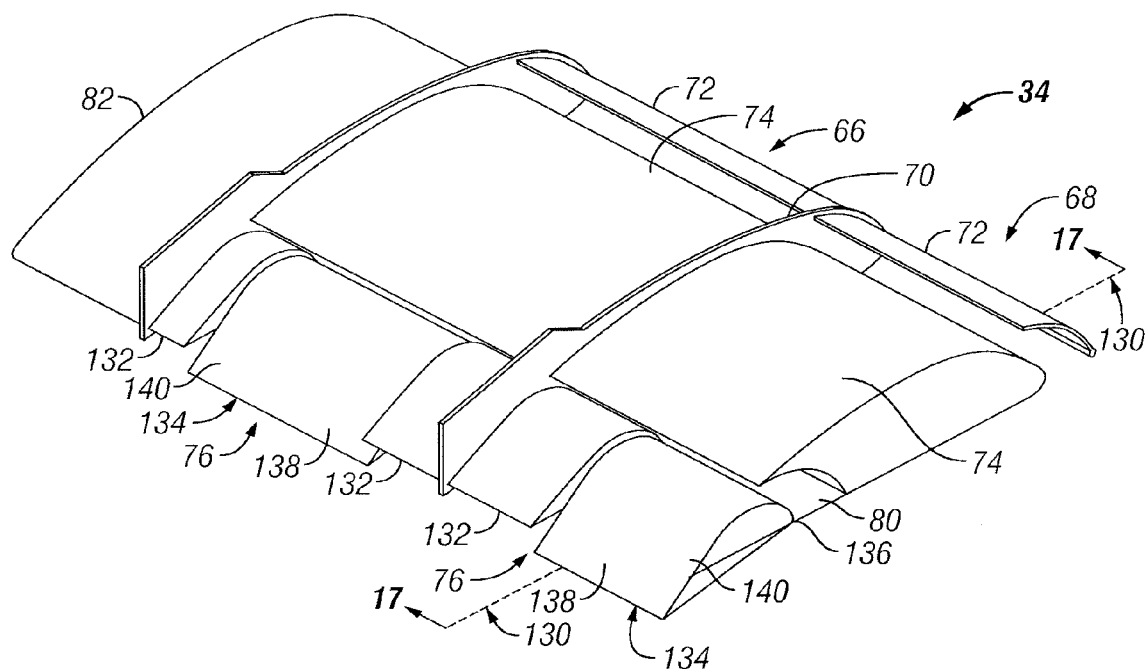
FIG. 16 is a perspective view of a submersible deflector comprising adjustable flaps in accordance with one embodiment of the present invention.
Figure 17:
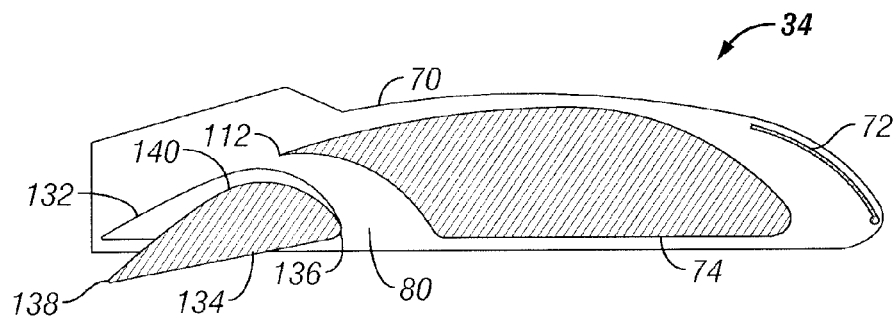
FIG. 17 is a cross-sectional view of a submersible deflector comprising adjustable flaps in accordance with one embodiment of the present invention.

FIGS. 14-17 illustrate another technique for adjusting the yaw and/or roll angles of the submersible deflectors 34 in accordance with embodiments of the present invention. While FIGS. 14 and 16 illustrate the submersible deflector 34 without the lower fin section 84, this is for illustration only, and it should be understood that the submersible deflector 34 could further include a lower tin section 84 in accordance with one embodiment of the present invention. FIGS. 15 and 17 are cross-sectional views of the submersible deflector 34 of FIGS. 14 and 16 as taken along line 130. As illustrated, the submersible deflector 34 may include an upper submersible deflector portion 66 and a lower submersible deflector portion 68. In a similar manner to the embodiments shown on FIGS. 7-12, the upper submersible deflector portion 66 and the lower submersible deflector portion 68 each may comprise a first foil 72 and a second foil 74. However, the third foil 76 in each of the upper and lower submersible deflector portions 66, 68 has been modified, in this example, to include one or more fixed foil portions 132 and one or more adjustable flaps 134. In the illustrated embodiment, the upper submersible deflector portion 66 includes two fixed foil portions 132 and one adjustable flap 134 while the lower submersible deflector portion 68 includes one fixed foil portion 132 and one adjustable flap 134. As illustrated, the adjustable flap 134 in the upper submersible deflector portion 66 is located between the fixed foil portions 132. As further illustrated, the fixed foil portion 132 in the lower submersible deflector portion 68 is proximate the central plate 70 with the adjustable flap 134 proximate plate 84 (e.g., shown on FIG. 7).

In one embodiment, the adjustable flaps 134 may be moved to adjust the roll/yaw angles of the submersible deflector. In the illustrated embodiment, the adjustable flaps 134 include a leading flap edge 136 and a trailing flap edge 138. In one embodiment, moving the adjustable flaps 134 may include raising the trailing flap edge 138 of each of the adjustable flaps 134, as shown in FIGS. 14 and 15. At least a portion of the second slot 80 may decrease in area as the trailing flap edge 138 is raised. In particular, the outer surface 140 of the adjustable flaps 134 may move closer to the trailing second foil edge 112 as the trailing flap edge 138 is raised, thus decreasing the area of the second slot 80. In another embodiment, moving the adjustable flaps 134 may include lowering the trailing flap edge 138, as shown in FIGS. 16 and 17. At least a portion of the second slot 80 may increase in area as the trailing flap edge 138 is lowered. In particular, the outer surface 140 of the adjustable flaps 134 may move away from the trailing second flow edge 112 as the trailing flap edge 138 is lowered, thus increasing the area of the second slot 80. In one particular embodiment, the adjustable flaps 134 may be moved such that the adjustable flaps 134 have opposite angles, for example, with one of the adjustable flaps 134 raised (e.g., raising trailing flap edge 138) and the other one of the adjustable flaps 134 lowered (e.g., lowering trailing flap edge 138). By moving the adjustable flaps 134 opposite to one another, the submersible deflector 34 can be caused to pivot about the center plate 70, thus changing the roll angle.

While the preceding description is directed to electromagnetic survey systems, those of ordinary skill in the art will appreciate that it may be desirable to use embodiments of the methods and systems of the present invention to control spread and/or depth in other geophysical surveys. For example, any of a variety of different energy sources may be used, including, for example, seismic air guns, water guns, vibrators, or arrays of such devices. In addition, any of a variety of different geophysical sensors may be used, including, for example, seismic sensors, such as geophones, hydrophones, or accelerometers.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A submersible deflector, comprising:
   an upper portion comprising:
      an upper fin section at a top end of the submersible deflector; and
      upper foils disposed below the upper fin section, wherein the upper foils comprise:
         a first upper foil;
         a second upper foil, wherein the second upper foil is larger than the first upper foil, wherein the second upper foil is spaced from the first upper foil to define a first upper foil slot between the first upper foil and the second upper foil, wherein the second upper foil has a flat front side coupling a second upper foil inner surface and second upper foil outer surface; and a third upper foil, wherein the third upper foil is smaller than the second upper foil, wherein the third upper foil is spaced from the second upper foil to define a second upper foil slot between the second upper foil and the third upper foil; and a lower portion comprising:
a lower fin section at a bottom end of the submersible deflector; and
lower foils disposed between the upper foils and the lower fin section, wherein the lowers foils comprise:
a first lower foil;
a second lower foil, wherein the second lower foil is larger than the first lower foil, wherein the second lower foil is spaced from the first lower foil to define a first lower foil slot between the first lower foil and the second lower foil, wherein the second lower foil has a flat front side coupling a second lower foil inner surface and second lower foil outer surface; and
a third lower foil, wherein the third lower foil is smaller than the second lower foil, wherein the third lower foil is spaced from the second lower foil to define a second lower foil slot between the second lower foil and the third lower foil.

2. The submersible deflector of claim 1, wherein the second upper foil slot decreases in area as the second upper foil slot moves from a leading edge of the third upper foil along a profile of the second upper foil.

3. The submersible deflector of claim 1, wherein the first upper foil and the first lower foil are both formed from sheet metal.

4. The submersible deflector of claim 1, wherein the first upper foil has a widest point that is about 0.1% to about 5% of a direct distance between a leading edge and a trailing edge, wherein the leading edge is from a front side of the first upper foil, wherein the trailing edge is from a rear side of the first upper foil.

5. The submersible deflector of claim 1, wherein second upper foil has a widest point that is at least about 25% of a direct distance between a leading edge and a trailing edge, wherein the leading edge is from a front side of the second upper foil, wherein the trailing edge is from a rear side of the second upper foil.

6. The submersible deflector of claim 1, wherein the second upper foil inner surface is generally concave, and wherein the second upper foil outer surface is generally convex.

7. The submersible deflector of claim 1, wherein the third upper foil has a widest point that is at least about 25% to about 50% of a direct distance between a leading edge and a trailing edge, wherein the leading edge is from a front side of the third upper foil, wherein the trailing edge is from a rear side of the third upper foil.

8. The submersible deflector of claim 1, wherein the upper fin section comprises an interior chamber, wherein the interior chamber contains a buoyant material, wherein the lower fin section comprises an interior chamber, and wherein the interior chamber contains a ballast material.

9. The submersible deflector of claim 1, wherein the third upper foil and the third lower foil are each adapted to have one or more adjustable flaps configured to cause the submersible deflector to pivot.

10. The submersible deflector of claim 1, further comprising a center plate disposed between the upper foils and the lower foils, wherein the center plate comprises a central tow point.

11. A marine geophysical survey system, comprising:
a streamer coupled to a survey vessel;
a submersible deflector coupled to the streamer, wherein the submersible deflector comprises:
an upper portion comprising:
an upper fin section at a top end of the submersible deflector; and
upper foils disposed below the upper fin section, wherein the upper foils comprise:
a first upper foil;
a second upper foil, wherein the second upper foil is larger than the first upper foil, wherein the second upper foil is spaced from the first upper foil to define a first upper foil slot between the first upper foil and the second upper foil, wherein the second upper foil has a flat front side coupling a second upper foil inner surface and second upper foil outer surface; and
a third upper foil, wherein the third upper foil is smaller than the second upper foil, wherein the third upper foil is spaced from the second upper foil to define a second upper foil slot between the second upper foil and the third upper foil, and
a lower portion comprising:
a lower fin section at a bottom end of the submersible deflector; and
lower foils disposed between the upper foils and the lower fin section, wherein the lowers foils comprise:
a first lower foil;
a second lower foil wherein the second lower foil is larger than the first lower foil, wherein the second lower foil is spaced from the first lower foil to define a first lower foil slot between the first lower foil and the second lower foil, wherein the second lower foil has a flat front side coupling a second lower foil inner surface and second lower foil outer surface; and
a third lower foil, wherein the third lower foil is smaller than the second lower foil, wherein the third lower foil is spaced from the second lower foil to define a second lower foil slot between the second lower foil and the third lower foil; and
geophysical sensors disposed on the streamer at spaced apart locations;
wherein the marine geophysical survey system is configured for performing a geophysical survey at a depth of at least about 25 meters.

12. The system of claim 11, wherein the second upper foil slot decreases in area as the second upper foil slot moves from a leading edge of the third upper foil along a profile of the second upper foil.

13. The system of claim 11, wherein the first upper foil and the first lower foil are both formed from sheet metal.

14. The system of claim 11, wherein the first upper foil has a widest point that is about 0.1% to about 5% of a direct distance between a leading edge and a trailing edge, wherein the leading edge is from a front side of the first upper foil, wherein the trailing edge is from a rear side of the first upper foil.

15. The system of claim 11, wherein second upper foil has a widest point that is at least about 25% of a direct distance between a leading edge and a trailing edge, wherein the leading edge is from a front side of the second upper foil, wherein the trailing edge is from a rear side of the second upper foil.

16. The system of claim 11, wherein the second upper foil inner surface is generally concave, and wherein the second upper foil outer surface is generally convex.

17. The system of claim 11, wherein the third upper foil has a widest point that is at least about 25% to about 50% of a direct distance between a leading edge and a trailing edge, wherein the leading edge is from a front side of the third upper foil, wherein the trailing edge is from a rear side of the third upper foil.

18. The system of claim 11, wherein the upper fin section comprises an interior chamber, wherein the interior chamber contains a buoyant material, wherein the lower fin section comprises an interior chamber, and wherein the interior chamber contains a ballast material.

19. The system of claim 11, wherein the third upper foil and the third lower foil are each adapted to have one or more adjustable flaps configured to cause the submersible deflector to pivot.

20. The system of claim 11, wherein the submersible deflector further comprises a center plate disposed between the upper foils and the lower foils, wherein the center plate comprises a central tow point.

21. The system of claim 11, further comprising bridle lines coupled to a front of the submersible deflector, wherein a length of each of the bridle lines is configured to be independently adjustable.

22. The system of claim 11, wherein the streamer is coupled to a rear side of the submersible deflector whereby the streamer is configured to be towed behind the submersible deflector as the marine geophysical survey system is moved through a body of water.

23. The system of claim 11, wherein the geophysical sensors comprise electromagnetic sensors.

24. A submersible deflector, comprising:
an upper portion comprising:
an upper fin section at a top end of the submersible deflector; and
upper foils disposed below the upper fin section, wherein the upper foils comprise:
a first upper foil, wherein the first upper foil has a widest point that is about 0.1% to about 5% of a direct distance between a leading edge of the first upper foil and a trailing edge of the first upper foil;
a second upper foil spaced from the first upper foil to define a first upper foil slot between the first upper foil and the second upper foil, wherein the second upper foil has a flat front side coupling a second upper foil inner surface and second upper foil outer surface, wherein second upper foil has a widest point that is at least about 25% of a direct distance between a leading edge of the second upper foil and a trailing edge of the second upper foil; and
a third upper foil spaced from the second upper foil to define a second upper foil slot between the second upper foil and the third upper foil, wherein the second upper foil slot decreases in area as the second upper foil slot moves from a leading edge of the third upper foil along a profile of the second upper foil, wherein the third upper foil has a widest point that is at least about 25% to about 50% of a direct distance between a leading edge of the third upper foil and a trailing edge of the third upper foil; and
a lower portion comprising:
a lower fin section at a bottom end of the submersible deflector; and
lower foils disposed between the upper foils and the lower fin section, wherein the lowers foils comprise:
a first lower foil, wherein the first lower foil has a widest point that is about 0.1% to about 5% of a direct distance between a leading edge of the first lower foil and a trailing edge of the first lower foil;
a second lower foil spaced from the first lower foil to define a first lower foil slot between the first lower foil and the second lower foil, wherein the second lower foil has a flat front side coupling a second lower foil inner surface and second lower foil outer surface, wherein second lower foil has a widest point that is at least about 25% of a direct distance between a leading edge of the second lower foil and a trailing edge of the second lower foil; and
a third lower foil spaced from the second lower foil to define a second lower foil slot between the second lower foil and the third lower foil, wherein the second lower foil slot decreases in area as the second lower foil slot moves from a leading edge of the third lower foil along a profile of the second lower foil, wherein the third lower foil has a widest point that is at least about 25% to about 50% of a direct distance between a leading edge of the third lower foil and a trailing edge of the third lower foil.

* * * * *